(12) United States Patent
Gourdol et al.

(10) Patent No.: US 7,600,197 B2
(45) Date of Patent: Oct. 6, 2009

(54) GRAPHICAL USER INTERFACE HAVING CONTEXTUAL MENUS

(75) Inventors: Arno Gourdol, Cupertino, CA (US); Daniel Cooley, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 464 days.

(21) Appl. No.: 10/193,269

(22) Filed: Jul. 12, 2002

(65) Prior Publication Data

US 2002/0175955 A1 Nov. 28, 2002

Related U.S. Application Data

(63) Continuation of application No. 08/644,415, filed on May 10, 1999, now Pat. No. 6,493,006.

(51) Int. Cl.
 *G06F 3/00* (2006.01)
(52) U.S. Cl. .................. 715/817; 715/808; 715/825
(58) Field of Classification Search ......... 715/708–711, 715/811, 817, 825, 826, 808, 812, 813, 862
See application file for complete search history.

(56) References Cited

U.S. PATENT DOCUMENTS

| | | | | |
|---|---|---|---|---|
| 5,297,249 A | * | 3/1994 | Bernstein et al. | 715/854 |
| 5,491,783 A | * | 2/1996 | Douglas et al. | 715/846 |
| 5,500,936 A | * | 3/1996 | Allen et al. | 715/808 |
| 5,627,960 A | * | 5/1997 | Clifford et al. | 715/842 |
| 5,631,825 A | * | 5/1997 | van Weele et al. | 700/83 |
| 5,644,334 A | * | 7/1997 | Jones et al. | 345/419 |
| 5,664,090 A | * | 9/1997 | Seki et al. | 714/15 |
| 5,664,133 A | * | 9/1997 | Malamud et al. | 715/816 |
| 5,694,563 A | * | 12/1997 | Belfiore et al. | 715/821 |
| 5,717,848 A | * | 2/1998 | Watanabe et al. | 345/474 |
| 5,727,175 A | * | 3/1998 | Malone et al. | 715/763 |
| 5,736,983 A | * | 4/1998 | Nakajima et al. | 715/762 |
| 5,760,773 A | * | 6/1998 | Berman et al. | 715/808 |
| 5,798,762 A | * | 8/1998 | Sfarti et al. | 345/420 |
| 5,852,436 A | * | 12/1998 | Franklin et al. | 715/867 |
| 5,920,316 A | * | 7/1999 | Oran et al. | 715/779 |
| 6,008,806 A | * | 12/1999 | Nakajima et al. | 715/744 |
| 6,557,054 B2 | * | 4/2003 | Reisman | 710/33 |

* cited by examiner

*Primary Examiner*—Ba Huynh
(74) *Attorney, Agent, or Firm*—Buchanan Ingersoll & Rooney PC

(57) ABSTRACT

A contextual pop-up menu of frequently used commands is displayed by an application whenever a user carries out a particular action. The contextual menu appears at the location of a cursor, so that the displayed commands are spatially very close to an item on which an action is to be performed. The commands which are displayed in the contextual menu are not limited to those provided by an application associated with the selected item. Other commands, such as system level commands, for help items or other types of user assistance features, can be added to the menu before it is displayed to the user. In addition, plug-in modules can be employed to provide other commands associated with the selected item.

20 Claims, 6 Drawing Sheets

GRAPHICAL USER INTERFACE HAVING CONTEXTUAL MENUS

RELATED APPLICATIONS

This application is a continuation of application Ser. No. 08/644,415, filed May 10, 1996 now U.S. Pat. No. 6,493,006.

FIELD OF THE INVENTION

The present invention is directed to graphical user interfaces that are employed in computer systems, such as personal computers, and more particularly to a graphical user interface that provides a menu of commands that are specifically related to the context of an item selected by a user.

BACKGROUND OF THE INVENTION

The evolution of the computer industry is unparalleled in its rate of growth and complexity. Personal computers, for example, which began as little more than calculators having limited memory, tape-driven input capabilities and monochrome displays are now able to handle almost any data processing task with relative ease. While the ever-growing increase in computing power provides greater capabilities for application programmers and end users alike, the corresponding increase in complexity creates an ease of use problem. Consequently, computer systems designers are faced with a new challenge, namely to harness the available computing power in a form that is usable even by those with relatively little computer training, to ease the transition of users into a computer-based information paradigm.

In pursuit of this objective, various input/output philosophies, such as "user friendly", "wysiwyg" and "menu driven", have become popular. These approaches to the input/output issue are particularly applicable to microcomputers, also known as personal computers, which are intended to appeal to a broad audience of computer users, including those who have no previous computer experience. An important aspect of computers which employ these input/output concepts is the interface which allows the user to input commands and data, and receive results. One particularly prevalent form of interface is known as the graphical user interface (GUI).

One popular type of GUI display is based on a visual metaphor which defines a monitor screen to be a workspace known as a "desktop", in which the contents of documents are presented in relocatable regions known as "windows." In addition to windows, the graphical user interface typically includes icons that represent various objects in a computer system. In this context, the term "object" refers to any software entity that exists in the memory of the computer and constitutes a specimen of a particular class. For example, an object can be a data file which contains the contents of a document. It can also be an application program or other type of service provider, such as a hardware driver. An object can also be a container for other objects, such as a folder or a window.

One of the advantages offered by the graphical user interface, in terms of making the computer easier to use, is the ability for the user to effortlessly manipulate objects by moving, or otherwise acting upon, their icon representations. For example, a graphical user interface typically includes a cursor, or a similar type of pointing device, that is controlled by the user to select objects. By actuating a button or key while the cursor is positioned over an icon, for example by clicking a mouse button, the user can select the object to perform an action upon it. If the icon represents an application program, the action might be to launch the program. If the icon represents a data file, the action might cause the file to be opened within the application program that was used to create it. Alternatively, the file can be copied, moved into a folder, deleted, or the like.

Another feature of graphical user interfaces that contributes to their ease of use is menus, which provide a simple, straightforward method for the user to view and choose commands that relate to an application running on the computer. In one popular format, a root menu is located in a menu bar at the top of the screen, immediately above the desktop. The menu bar contains a number of menu items which represent general categories of commands. If a user clicks a mouse button while the cursor is positioned over one of these items a "pull-down" menu appears, listing the commands available within that category. For example, a "File" category might contain commands that are appropriate to files as a whole, such as "open", "close" and "print". Another category labeled "Edit" might contain commands relating to the editing of objects, such as "copy", "paste", and the like. For further information relating to pull-down menus, reference is made to U.S. Pat. Re. 32,632, the disclosure of which is incorporated herein by reference.

Typically, when an action is to be performed upon an object, the user first selects the object, for example by clicking a mouse button while the cursor is positioned over the object, and then chooses the particular command to be performed on the selected object. Thus, if the user wishes to print a particular document, the user can first select the icon which represents that document, and then move the cursor to the menu bar and click upon the "File" category, to cause its pull-down menu to appear. The cursor is then scrolled down the menu until it is positioned over the "print" command, at which time the user actuates the mouse button to initiate the command to print the document.

While the graphical user interface has contributed significantly to the ease of use of computers, particularly the ability to carry out actions through a cursor and menus, it is desirable to further enhance the user experience. For example, as with any new environment, a certain amount of learning time is required for beginning users to discover which commands are applicable in a particular context, and the locations of these commands within the various pull-down menus under the root menu. Further in this regard, similar commands may not appear under the same headings in different, but related applications. For example, in a text document, the user may desire to change the margins. In one word processing program, the command for doing so may be located under a "format" category, whereas in another word processing application, it may be located under a sub-category labeled "document" or the like.

Another factor to consider in the user experience is the physical effort required by the user. One form of effort is number of mouse button clicks, or similar types of key actuations, that are needed. Typically, one or more clicks are necessary to select an item, and an additional one or more clicks are required to choose a command from the menu. Another form of effort is embodied in the distance that the cursor is required to travel throughout an operation. This distance is directly related to the amount of travel that is required by a mouse, or the amount of rotation that a user must impart to a trackball, or the like, from the first click of the selection to the last click of the command. All of these factors combine to form the total duration of the action that is typically required on the part of the user, beginning with the selection of an item, moving to the menu bar, and choosing a command.

On computer systems with large or multiple monitors, these actions can result in a rather lengthy process. For new users who must search for commands, the process can be even longer. In addition, for computer systems having relatively small cursor control devices, such as portable computers which employ a small trackball, lengthy cursor movements can prove to be cumbersome.

Therefore, it is desirable to provide a graphical user interface which makes it easier for users to discover the commands that are appropriate in a given context, as well as give the user a more efficient means for quickly executing the commands.

BRIEF STATEMENT OF THE INVENTION

In accordance with the present invention, these objectives are met by means of menu-oriented interface known as a contextual menu. Generally speaking, a contextual menu is a pop-up menu that is displayed by an application whenever a user carries out a particular action. For example, this action might be the clicking of a special mouse button, or clicking a regular mouse button in combination with the depression of a particular key on a keyboard. In response to this action, an application program associated with the selected item provides a menu of appropriate commands, which are based on the current context, selection and cursor location. In one embodiment of the invention, the commands which appear in the contextual menu are those which are most frequently used with a particular type of object.

The contextual menu appears on the desktop at the location of the cursor, rather than as a pull-down menu at the periphery of the desktop. Preferably, the displayed commands are spatially close to the item on which the action is to be performed, cutting down on the amount of cursor travel that is needed to perform the action. In addition, since the menu contains those commands which are appropriate to the selection, it becomes easy for both new and experienced users to quickly determine the commands that are available for different contexts in a new application.

As a further feature of the invention, the commands which are displayed in the contextual menu are not limited to those provided by a specific application that is associated with the selected item. Rather, other commands can be added to the menu before it is displayed to the user. These other commands can include, for example, system level commands, such as help items or other types of user assistance features. In addition, plug-in modules can be employed to provide other commands associated with the selected item. For example, if a user selects an item of text, a word processing program might provide commands for cutting, copying and pasting the text. A plug-in module for e-mail services can provide the user with a command to send the selected text as a message to another user. Another plug-in module might provide the user with a command that allows the selected text to be sent via facsimile to a remote destination.

The foregoing features of the invention, and the advantages provided thereby, are explained in greater detail hereinafter with reference to preferred embodiments illustrated in the accompanying drawings.

DETAILED DESCRIPTION

To facilitate an understanding of the present invention, its underlying principles are described hereinafter with reference to their implementation in a specific embodiment. In particular, certain references are made to features and terminology associated with the Macintosh® Operating System provided by Apple Computer, Inc. It will be apparent, however, that the practical applications of the present invention are not limited to this particular embodiment. Rather, it can be utilized in any type of computer system that employs a graphical user interface.

The present invention is directed to the manner in which a menu of commands is displayed to a user within a graphical user interface, to permit the user to perform actions on selected objects. The features of the invention can be implemented on a variety of different types of computers. An exemplary arrangement for the hardware components of a computer system is briefly described herein, to provide a thorough understanding of the manner in which the features of the invention cooperate with the components of a computer system to produce the desired results.

Figure 1:
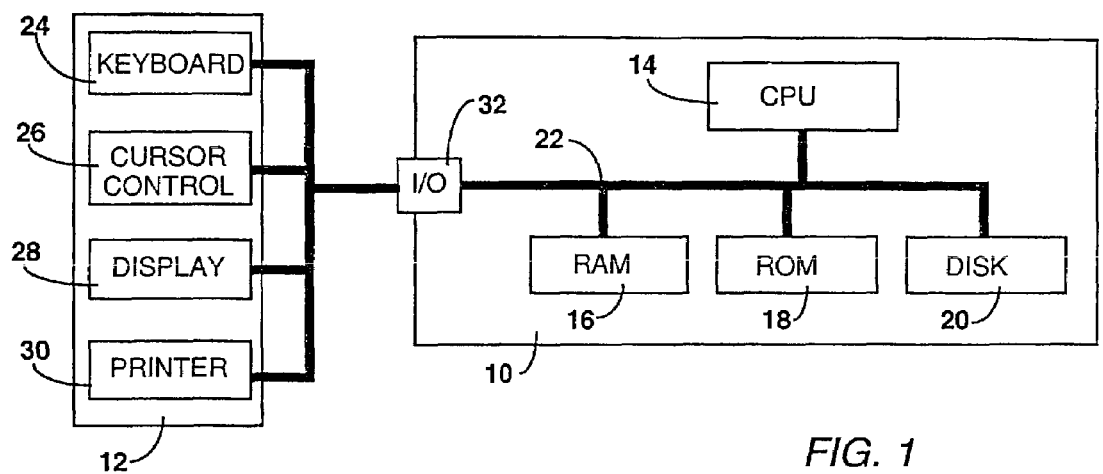
FIG. 1 is a block diagram of a computer system, of a type in which the present invention might be implemented.

Referring to FIG. 1, a computer system includes a computer 10 having a variety of external peripheral devices 12 connected thereto. The computer 10 includes a central processing unit 14 and associated memory. This memory generally includes a main or working memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen, or the like. A display device 28, such as a CRT monitor or an LCD screen, provides a visual display of the information that is being processed within the computer, for example the contents of a document or a computer-generated image. A hard copy of this information can be provided through a printer 30, facsimile machine (not shown), or similar such device. Each of these external peripheral devices communicates with the CPU 14 by means of one or more input/output ports 32 on the computer.

Figure 2:
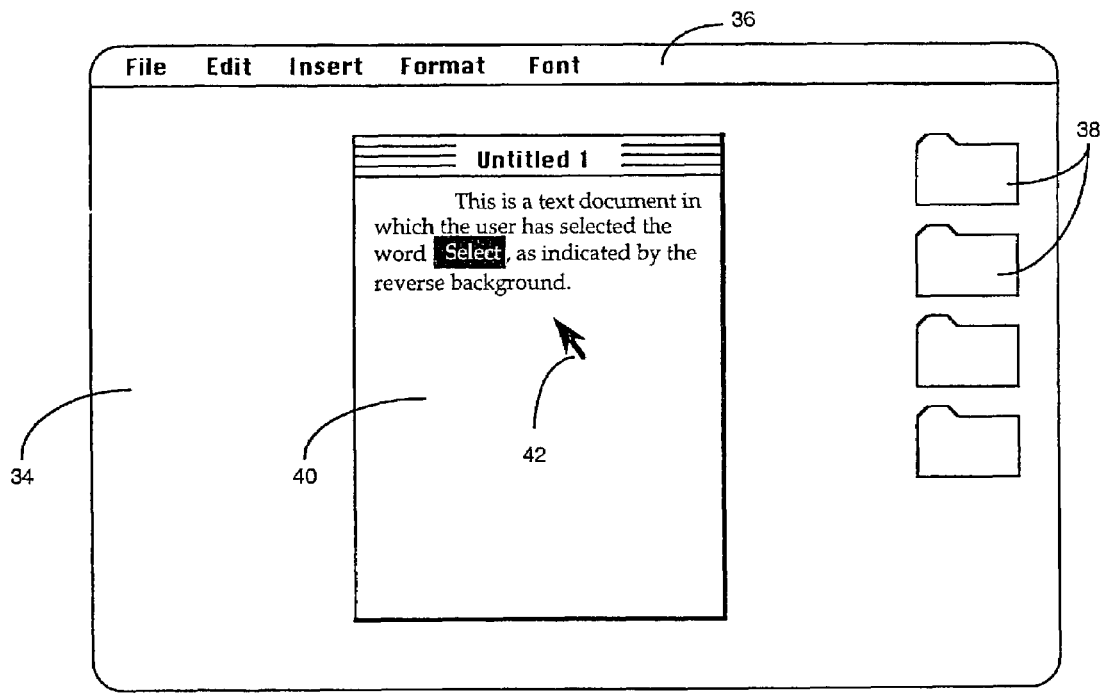
FIG. 2 is an illustration of an exemplary desktop displayed on a computer's monitor.

FIG. 2 illustrates an example of a desktop which can be presented to a user on the display 28, via a graphical user interface. Typically, the desktop display is controlled by the operating system which is loaded into the computer's main memory 16 upon startup, and which causes the computer to carry out basic operations. The desktop 34 defines a space within which the user can manipulate files, edit documents, and the like. Above the desktop is a menu bar 36 containing a root menu of commands available to the user. Located on the desktop are various icons 38 representing different folders in which the user may have stored documents, application programs, and other objects. Also shown on the desktop is a window 40 which displays the contents of a text document. For example, the user may be operating a word processing program. As is well known, if the word processing program is the currently active program with which the user is interacting, the items appearing in the menu bar 36 pertain to commands that are provided by that program. If the user switches to another program, a different set of commands might appear in the root menu.

Figure 3:
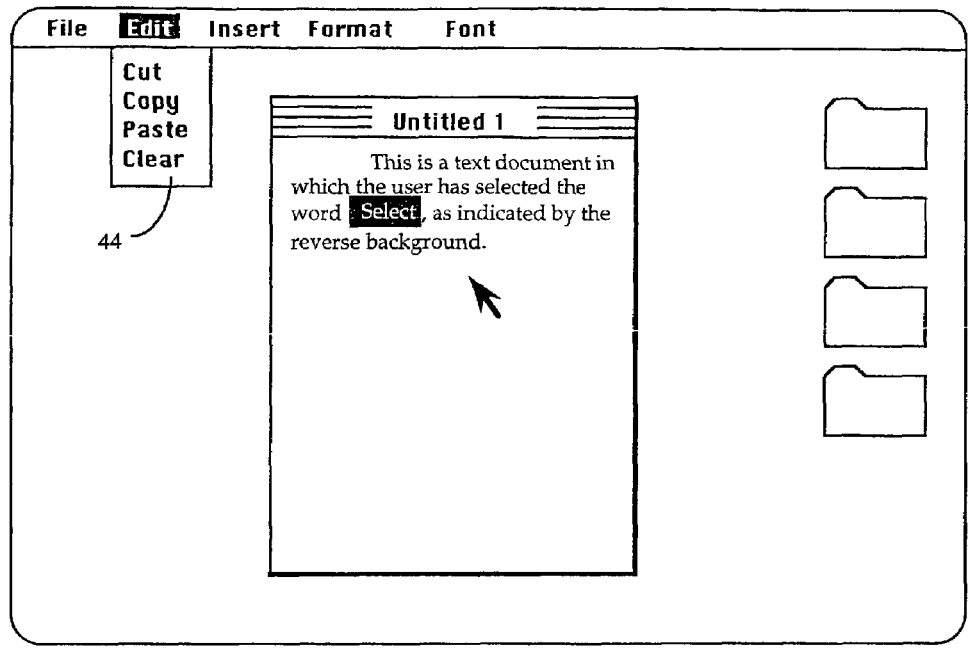
FIGS. 3-4 are illustrations of the desktop with two different pull-down menus.

In the particular example illustrated in FIG. 2, the user has selected one word within the text document, namely the word "Select", as indicated by the highlighting. For example, the user could have selected this word by double-clicking a mouse button while a cursor 42 is positioned over the word. Once the user selects an object, in this case a word, there are a number of different actions that can be performed with respect to it. For example, the user may desire to move the word, for example by "cutting" it from its current location and "pasting" it at another location. Alternatively, the user may desire to copy the word, so that it can be duplicated at another location within the document. To perform either of these actions, the user moves the cursor to the "Edit" item in the menu bar 36 and performs an appropriate action, e.g. clicking a mouse button, to cause a pull-down menu to appear, as illustrated in FIG. 3. The pull-down menu 44 lists commands associated with the "Edit" category. Included within those commands are the options to "cut", "copy", and "paste" the selected word. By moving the cursor over any one of these listed commands, and performing an appropriate action, such as clicking or releasing a mouse button, the chosen operation will be performed upon the selected object.

Figure 4:
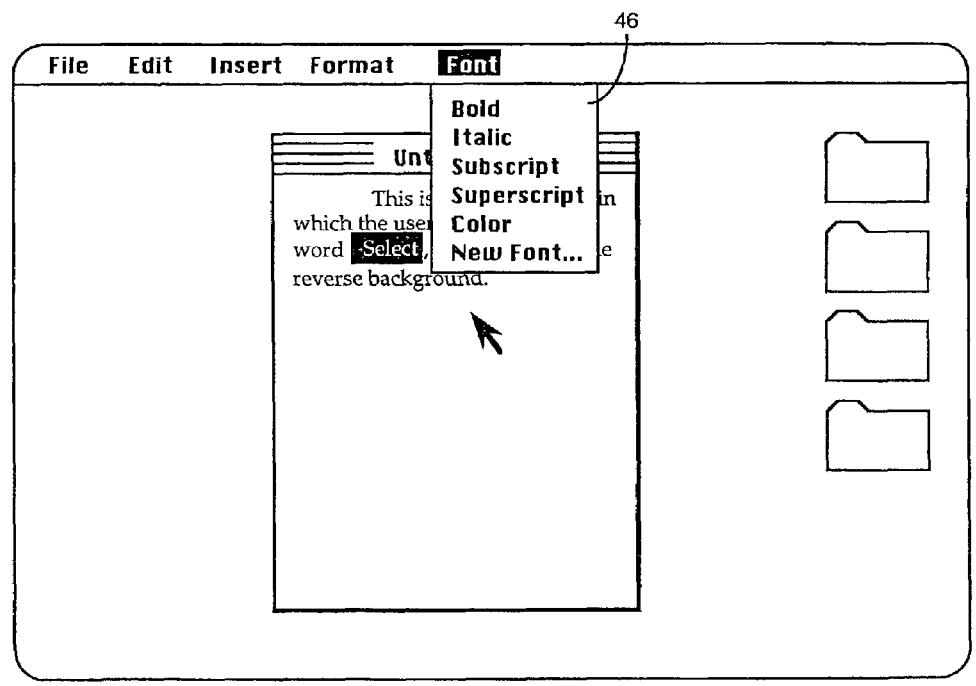

As an alternative to manipulating the object within the text, the user may desire to change the appearance of the selected word. In this case, the user chooses the "Font" category from the root menu, to display its pull-down menu 46, as illustrated in FIG. 4. Referring thereto, the user is given the option to perform various actions which affect the appearance of the selected word.

From the foregoing, it can be seen that, each time an action is to be performed upon an object by means of a menu command, the user first selects the object on the desktop, and then moves the cursor to the menu bar to locate the desired command. If the user is not familiar with the particular category under which the command appears, the user may access several pull-down menus from the menu bar before the desired command is actually located.

Figure 5:
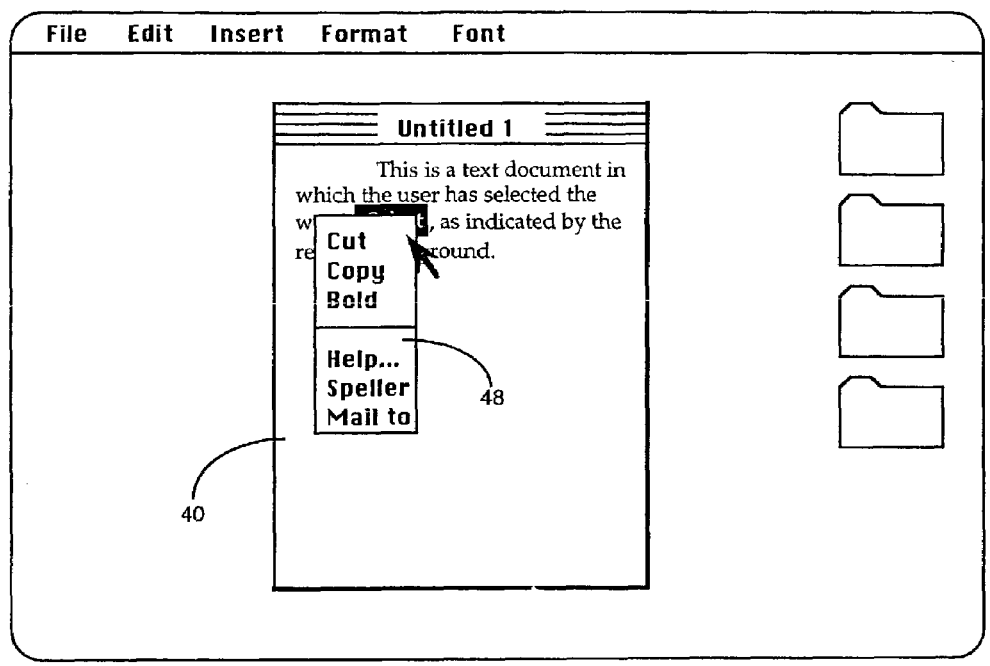
FIG. 5 is an illustration of the desktop with a contextual menu.

In accordance with the present invention, the amount of effort required on the part of the user is reduced, both in terms of knowledge of commands and physical movement of the cursor, to thereby enhance the user experience. This reduction in effort is accomplished through the use of contextual pop-up menus. An example of a contextual menu is illustrated in FIG. 5. This example will be explained with reference to the previously described situation in which the user has selected the word "Select" within the text document in the window 40. After selecting the object of interest, the user performs another specified action that invokes a contextual menu. For example, if a mouse device has two or more buttons on it, the special action could be the actuation of a designated one of the mouse buttons. Alternatively, if the mouse device has only a single button, the special action could be the actuation of the mouse button in combination with the depression of a particular key on a keyboard. The following description will be provided for the situation in which a contextual menu is invoked via the actuation of a designated mouse button. In response to this action, a contextual menu 48 is displayed on the desktop.

As an alternative, it is not necessary for the user to first select an object and then request a contextual menu with a separate button click. Rather, the actuation of the designated button on the mouse can function to both select an object and call up a contextual menu at the same time.

The contextual menu has two main attributes which function to enhance the user experience. One of these attributes is the location of the menu itself. As illustrated in FIG. 5, the menu appears in the vicinity of the position where the cursor is located when the user takes the specified action. In the specific example of FIG. 5, the menu appears directly under the cursor. In practice, the menu can be offset from the cursor, for example so that it does not obscure the selected object. In any case, it is sufficiently close to the cursor such that the user is not required to move the cursor to the menu bar 36 at the top of the desktop to invoke commands that operate upon the selected object. Preferably, the commands appear on the desktop at the location of the cursor, thereby minimizing the amount of travel that is required for a mouse or other cursor control device.

The second major attribute of the contextual menu which contributes to the enhancement of the user experience is its content. The commands that are presented to the user in the contextual menu constitute those which are appropriate for the selected object. Thus, in the case of a text document in which one or more words have been selected, the commands listed in the contextual menu pertain to operations that can be performed on those words. As shown in the example of FIG. 5, those commands might include "cut", "copy" and "bold". For a different selected object, such as a graphic element, the contextual menu contains a different set of commands that are appropriate for that selection. In a preferred embodiment of the invention, the commands that are presented in a contextual menu do not necessarily constitute an exhaustive list of all commands that can be applied to the selected object. Rather, the most frequently used commands are selected for presentation in the contextual menu.

The specific commands presented in a contextual menu are determined, at least in part, by the designers of application programs that operate upon selected objects. For example, the designer of a word processing application may determine that, when a user selects individual words or groups of words, commands such as those illustrated in FIG. 5 are most likely to be used, and therefore appropriate. However, if the user selects a complete section of a document, or the entire document itself, it may be more likely that the user desires to reformat the document or change its font. Consequently, a different set of commands are presented in a contextual menu for that type of selection. Each application program therefore contains lists of commands that are to be displayed in a contextual menu for the different respective types of selections that can be made by users for the kind of data that is handled by the program. Thus, for example, a spreadsheet program might contain one list of commands that are to be displayed if the user selects a single data cell, another list of commands appropriate to the selection of a range of cells, and a third list of commands for the case where the user selects a chart within a spreadsheet.

In accordance with another feature of the present invention, the commands that are presented in a contextual menu are not limited to the choices provided by the currently active application program. Rather, additional commands can be displayed to invoke functions outside of those provided by the application. In the example of FIG. 5, three additional commands are shown at the bottom of the menu 48. The first one of these commands relates to a general help function, which is provided by the operating system itself. The latter two commands relate to a spelling checker and electronic mail capabilities, respectively. These two latter sets of functionality are provided by services outside of the word processing application itself. For example, they can be provided by separate software programs.

Figure 6:
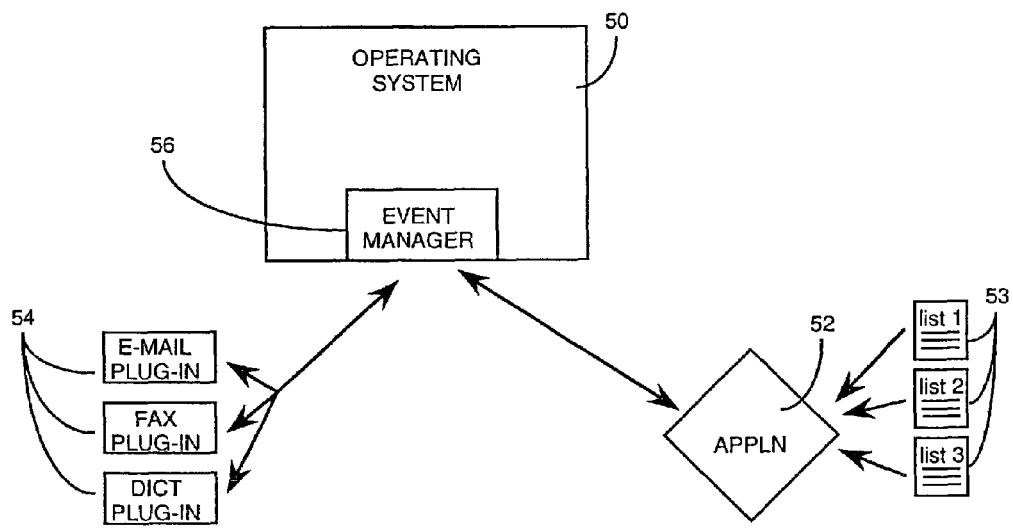
FIG. 6 is an architectural block diagram of the software components that operate to display a contextual menu.

The manner in which the present invention operates to display the contextual menus is explained with reference to FIGS. 6 and 7. FIG. 6 is an architectural block diagram of the software components that are involved in the presentation of a contextual menu. As discussed previously, one of the programs executed by a computer is its operating system 50, which controls the basic operations of the computer. In addition, one or more application programs 52 can be running on the computer. Various plug-in modules 54 can be loaded into the computer's memory 16, to provide specific types of functionality not available through the operating system or the application programs. For example, as illustrated in FIG. 6, one plug-in module may provide electronic mail capabilities, another may be associated with facsimile services, and a third may provide a dictionary of terms. Each of these components may be initially stored on the hard disk 20 of the computer, and loaded into its main memory 16 when the computer is running.

In operation, when the computer is initially started, each of the plug-in modules 54 is loaded into the memory 16, and registers itself with the operating system. The act of registration informs the operating system that the module is to be notified whenever an event relating to a contextual menu happens. The operating system builds a registry of active modules, and calls each module's initialization routine, so that it can determine the resources available within the system, for example.

Figure 7:
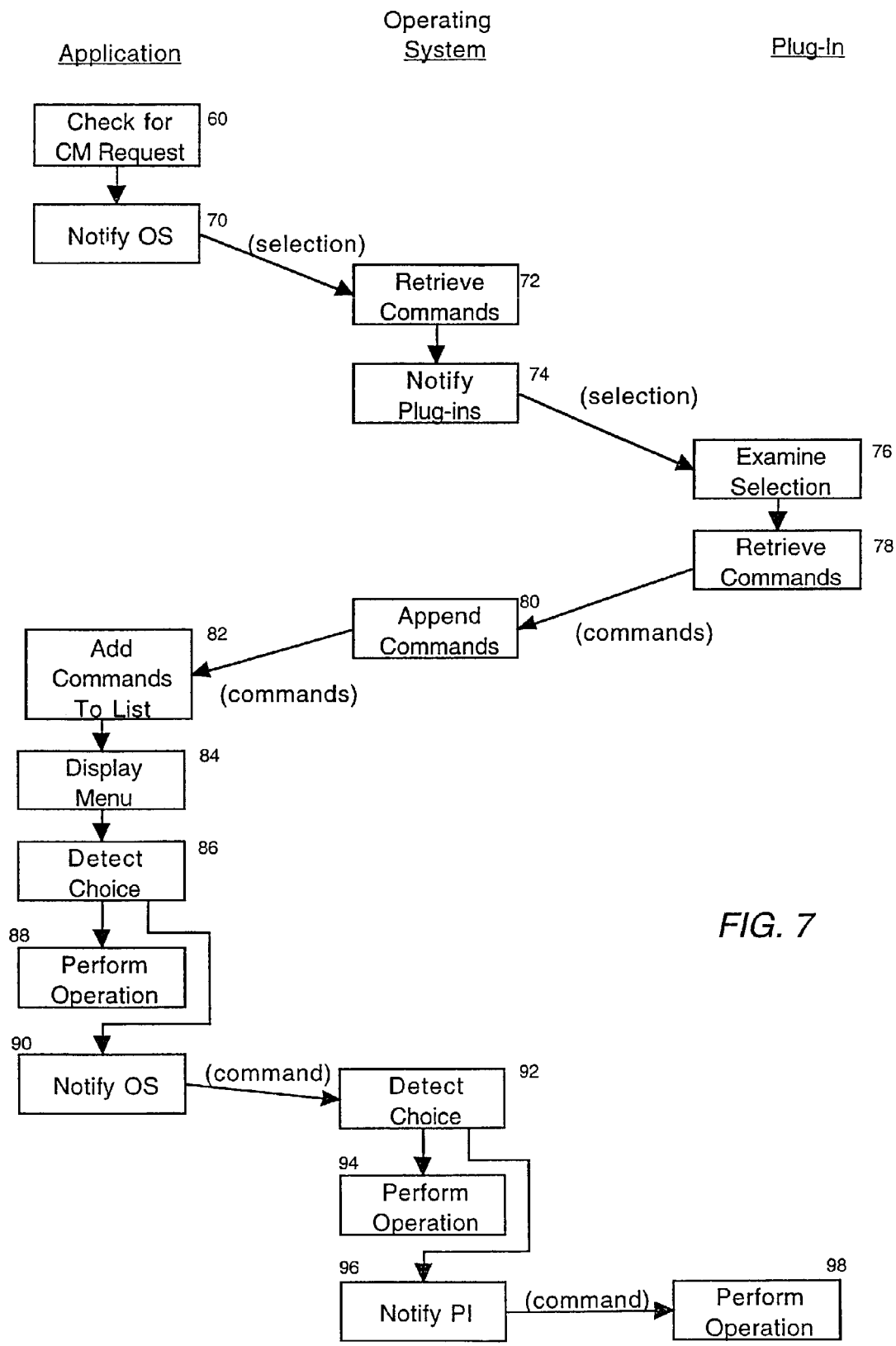
FIG. 7 is a flow diagram of the procedure for displaying a contextual menu.

The procedure for displaying a contextual menu is explained with further reference to the flow diagram of FIG. 7. The items in the flow diagram appear in three columns, which are respectively related to the application program, the operating system and the plug-in modules. When a user takes an action that calls for the display of a contextual menu, e.g. the actuation of a designated mouse button, the application program first determines at Step 60 whether the event should be treated as a special event related to contextual menus. For example, if the user has selected an item of content, a contextual menu would be appropriate. However, if the user has selected a non-content item, e.g. clicked on a command from a pull-down menu, a contextual menu would not be appropriate.

Figure 8:
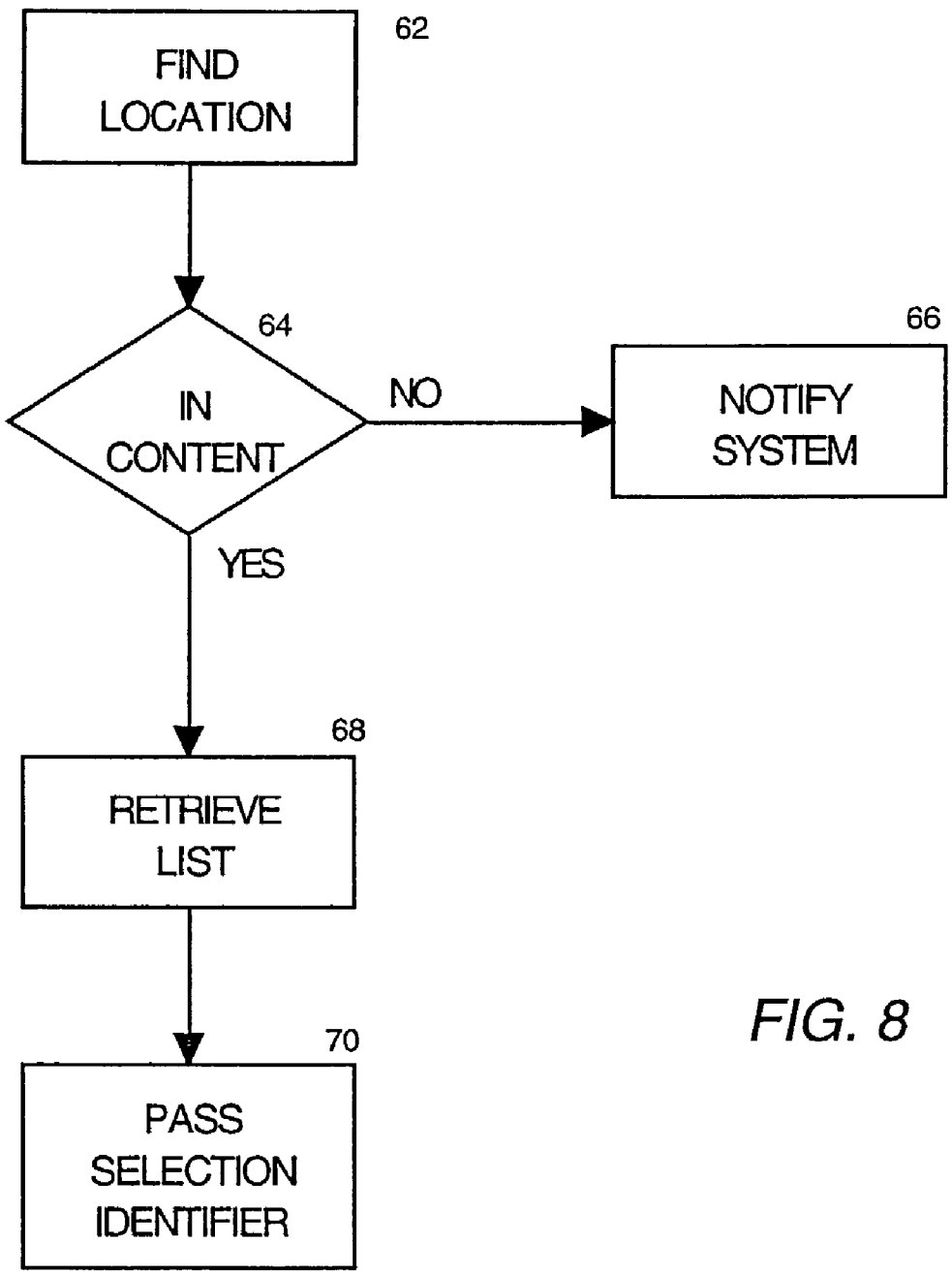

Referring to FIG. 8, if the currently active application determines that the mouse click has occurred with respect to an item of content, it calls a routine to determine the specific context of the event. At Step 62, the application obtains the location of the cursor, for example from the operating system. At Step 64, a determination is made whether the location corresponds to any item of content under the control of the application. For example, the application can check whether the cursor is located within any of its currently open windows, or some other object under its control. If not, the application passes control to the operating system at Step 66, so that the mouse click event can be handled appropriately. For example, the operating system may have its own contextual menu routine, or it may need to pass the event on to a different application program running on the computer.

If the mouse click event occurred on an item of content controlled by the active application, that application retrieves a command list appropriate to the selected content, at Step 68. Referring again to FIG. 6, an application may have several available command lists 53, that are suited to different situations. Depending upon the particular selection made by the user, the application program retrieves an appropriate one of the lists 53 for display in a contextual menu.

Before displaying the menu, the subroutine sends a message to the operating system at Step 70, to inform it that a contextual menu event has occurred. In addition to this notification, the subroutine also provides the operating system with an identification of the particular selection that has been made by the user. In the Macintosh Operating System, Versions 7.0 and later, for example, such an identification can be provided by means of a functionality known as Apple Events. Each time a user selects an object, an Apple Event occurs, which causes the generation of a descriptor of the selected object. For example, this descriptor can inform the operating system that the user has selected the fourteenth word in the first paragraph of the document "Untitled 1". The information that a contextual menu event has occurred, together with the selection, is passed to an event manager 56 within the operating system (see FIG. 6). In response thereto, the event manager determines whether any commands associated with the operating system are to appear in the contextual menu. For example, in some cases it may be appropriate to provide the user with access to system level commands, such as balloon help or user assistance sequences. In such a case, with reference to FIG. 7, the event manager retrieves the appropriate commands to be displayed, at Step 72.

In addition, at Step 74 the event manager notifies each of the plug-in modules which has registered with it. Each plug-in module is provided with the description of the selected content, and examines the selection at Step 76 to determine whether it can perform any activities on the selected object. For example, if the selection is text, a module such as a spell checker or a e-mailer will recognize that this is the type of data upon which it can perform an operation. If so, the module retrieves the commands associated with the activities it can perform at Step 78, and provides them to the operating system. The operating system appends these commands to those which it has retrieved, at Step 80, and passes them on to the application. After receiving the commands from the operating system, the application adds them to its own list of contextual menu commands at Step 82, and displays the complete menu to the user at Step 84, resulting in a display such as that illustrated in FIG. 5.

Figure 9:
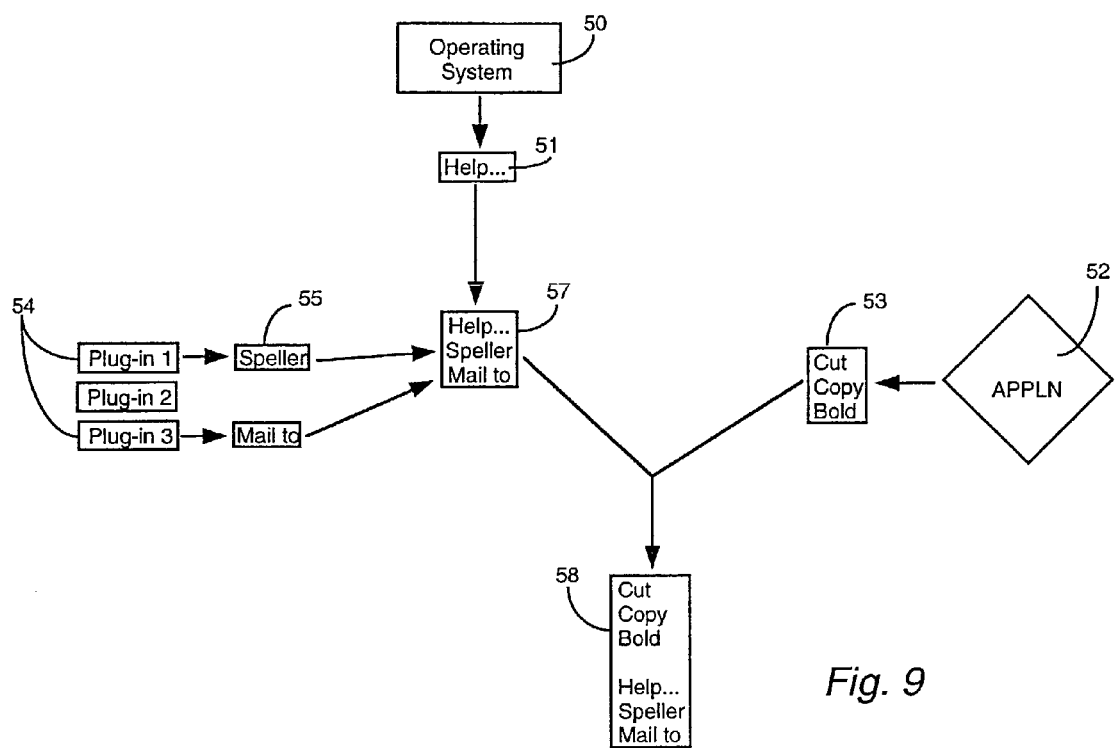

This procedure is schematically depicted in FIG. 9. As illustrated therein, two of the plug-in modules 54 have each provided at command 55 to be displayed in the contextual menu. These two commands are appended to the command 51 provided by the operating system 50. This combined set of commands 57 is provided to the application 52, and appended to its retrieved list of commands 53, to result in a complete list 58 that appears in the contextual menu.

If the user chooses one of the commands from the menu, the application program first detects at Step 86 whether the chosen command is one that it has provided, or one that was provided via the operating system. In the former case, the application program carries out the appropriate operation at Step 88. If the user selects one of the commands outside of those provided by the application, the operating system is informed of the selected command at Step 90. The operating system then detects the source of the chosen command at Step 92. If the command relates to a system level operation, the appropriate action is carried out at Step 94, e.g. display a balloon help item. Alternatively, if the command is one that was provided by a plug-in module, it is passed on to the module at Step 96, which then carries out the appropriate activity at Step 98.

From the foregoing, it can be seen that the present invention provides a graphical user interface which reduces the amount of effort required by the user to carry out frequently used operations. By displaying a contextual menu in the vicinity of the cursor when user initiates an action, the required amount of cursor movement is minimized. Furthermore, by displaying commands that are applicable to a selected object, the user is relieved of the burden of having to locate desired commands from multiple menus. In addition, by displaying commands available from sources outside of the application program within which the user is working, a greater number of actions can be conveniently carried out on the object.

It will be appreciated by those of ordinary skill in the art that the present invention can be embodied in other specific forms without departing from the spirit or essential characteristics thereof. For example, in the previously described embodiment the commands which appear in a contextual menu are predetermined and stand in lists. However, other approaches can be employed to determine the commands to display. For instance, it may be appropriate to keep a count of each command chosen by a user, and display those with the highest counts in the contextual menu. Alternatively, it may be desirable to select the commands at run-time by some other form of decision algorithm.

The presently disclosed embodiments are considered in all respects to be illustrative, and not restrictive. The scope of the invention is indicated by the appended claims rather than the foregoing description, and all changes that come within the meaning and range of equivalence thereof are intended to be embraced therein.

What is claimed is:

1. A user interface, comprising:
   means for selecting an item of content within a window associated with an application program;
   means for detecting a designated action with respect to said selected item of content;
   means responsive to said designated action for retrieving a list of commands provided by the application program and associated with said selected item of content;
   means for receiving other commands, said other commands being selectively provided from at least one other program, which has requested notification of said designated action, based on said selected item of content;
   means for adding said other commands to said list; and
   means for displaying said list with said added commands on a computer display.

2. The user interface of claim 1 wherein the designated action includes the positioning of a cursor on the selected item, and wherein said list is displayed at the location of the cursor.

3. The user interface of claim 1 wherein said other commands are provided by an operating system running on the computer.

4. The user interface of claim 1 wherein said other commands are provided by plug-in software modules associated with an operating system running on the computer.

5. A method for enabling a computer operator to invoke actions that are to be performed on objects appearing on a computer display, comprising the steps of:
   detecting a designated action by a user with respect to an item of content within a window associated with an application program running on a computer;
   retrieving a list of commands provided by the application program and associated with said item of content, in response to said designated action;
   receiving other commands, said other commands being selectively provided from at least one other program, which has requested notification of said designated action, based on said item of content;
   adding said other commands to said list; and
   displaying said list of commands on the computer display.

6. The method of claim 5 wherein the designated action includes the positioning of a cursor on the object, and wherein said list is displayed at the location of the cursor.

7. The method of claim 5 wherein said other commands are provided by an operating system running on the computer.

8. The method of claim 5 wherein said other commands are provided by plug-in software modules associated with an operating system running on the computer.

9. The method of claim 8 further including the step of detecting the selection of one of said other commands by the user, and performing an operation on the object via one of said plug-in software modules.

10. A computer readable medium having stored thereon an application program which performs the functions of:
    detecting a designated action by a user with respect to an item of content within a window associated with an application program running on a computer;
    retrieving a list of commands provided by the application program and associated with said item of content, in response to said designated action;
    receiving other commands, said other commands being selectively provided from at least one other program, which has requested notification of said designated action, based on said item of content;
    adding said other commands to said list; and
    displaying said list of commands on the computer display.

11. The computer readable medium of claim 10, wherein said designated action includes the positioning of a cursor on said item of content, and wherein said list is displayed at the location of the cursor.

12. The computer readable medium of claim 10, wherein said other commands are provided by an operating system or plug-in software modules associated with an operating system running on the computer.

13. The computer readable medium of claim 12, further including the step of detecting the selection of one of said other commands by the user, and performing an operation on the object via said operating system or one of said plug-in software modules.

14. A user interface via which computer operator causes actions to be performed on objects appearing on a computer display, comprising:
    means for detecting a designated action by a user with respect to a selected item of content in a window associated with an application program running on a computer;
    means responsive to said designated action for retrieving a list of commands provided by the application program and associated with the selected item of content;
    means for receiving other commands, said other commands being selectively provided from at least one other program, which has requested notification of said designated action, based on said selected item of content;
    means for adding the other commands to said retrieved list of commands; and
    means for displaying said list of commands on the computer display in the vicinity of the selected item of content.

15. The user interface of claim 14 wherein the designated action includes the positioning of a cursor on the selected item, and wherein said list is displayed at the location of the cursor.

16. A computer system, comprising:
    a display device for displaying a window associated with an application program running on said computer system, and content generated by said application program within said window;

a user interface for controlling the display of said window and content, said user interface including a pointing mechanism via which a user can select one or more items of content appearing within said window and perform actions with respect thereto;

a user input device with which a user can indicate a request to perform a particular operation; and an operating system, wherein said application is responsive to actuation of said user input device to request said particular operation for said selected item of content, said application:
  generating a list of commands relating to said selected item,
  receiving one or more additional commands from the operating system, said other commands being selectively provided based on said selected item from said operating system or from one or more applications that have requested notification of said particular operation, and do not control said selected item of content,
  adding said one or more additional commands to said generated list of commands, and
  displaying on said display device said generated list of commands in the vicinity of said selected item of content.

17. The computer system of claim 16, wherein applications not controlling said selected item of content are capable of providing one or more additional commands to said operating system to add to said list of commands generated by said application.

18. The computer system of claim 17 wherein said applications not controlling said selected item of content are plug-in modules in said operating system providing specific functionality.

19. The computer system of claim 16 wherein said list of commands generated by said application is dependent upon criteria selected from a list consisting of the type of said selected objects, the number of said selected objects and the size of said selected objects.

20. The computer system of claim 16 wherein the commands in said list are selected from commands which were most used previously by the user.

* * * * *

UNITED STATES PATENT AND TRADEMARK OFFICE
CERTIFICATE OF CORRECTION

PATENT NO. : 7,600,197 B2
APPLICATION NO. : 10/193269
DATED : October 6, 2009
INVENTOR(S) : Arno Gourdol et al.

It is certified that error appears in the above-identified patent and that said Letters Patent is hereby corrected as shown below:

Front page, Section (63), change "May 10, 1999" to --May 10, 1996--.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,600,197 B2  Page 1 of 1
APPLICATION NO. : 10/193269
DATED : October 6, 2009
INVENTOR(S) : Gourdol et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Fifth Day of October, 2010

David J. Kappos
*Director of the United States Patent and Trademark Office*